Jan. 2, 1962 C. L. DRACKA 3,015,245
HANDLE-LEVER GRIP, SLIDABLE JAW WRENCH
Filed Jan. 27, 1960 2 Sheets-Sheet 1
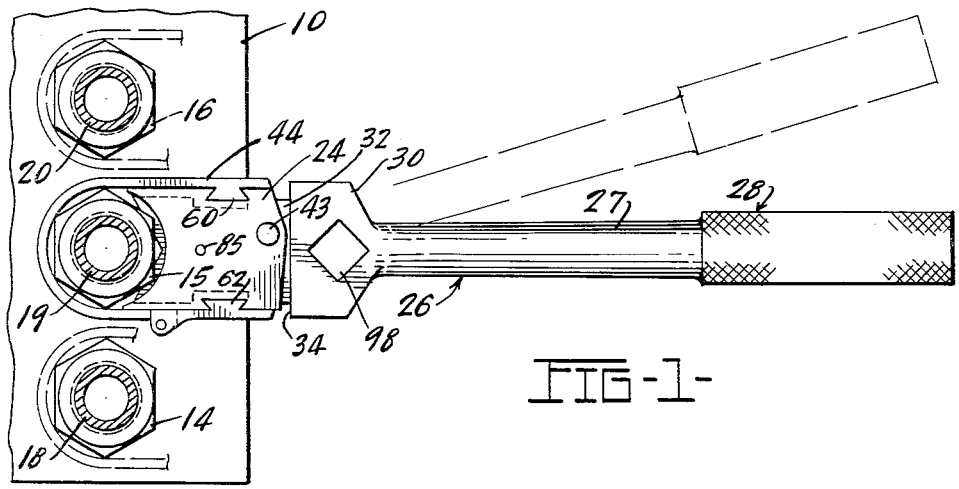
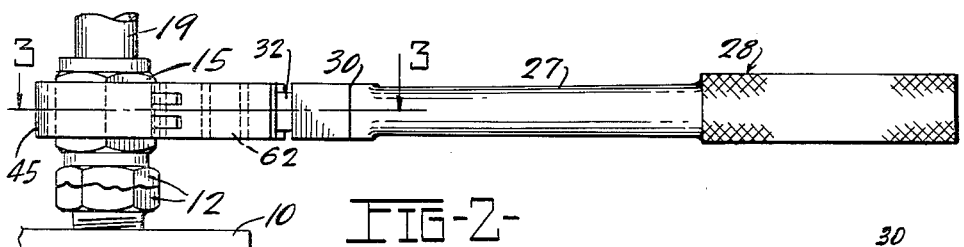
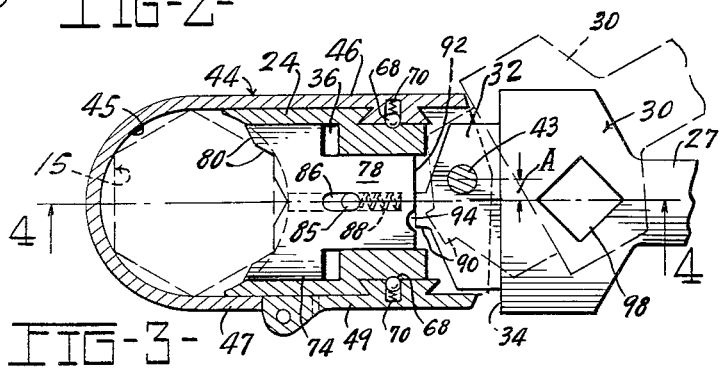
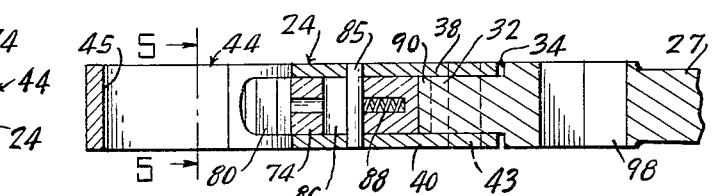
INVENTOR:
CLARENCE L. DRACKA.
BY
Harry O. Ernsberger
ATTY.

Jan. 2, 1962 C. L. DRACKA 3,015,245
HANDLE-LEVER GRIP, SLIDABLE JAW WRENCH
Filed Jan. 27, 1960 2 Sheets-Sheet 2
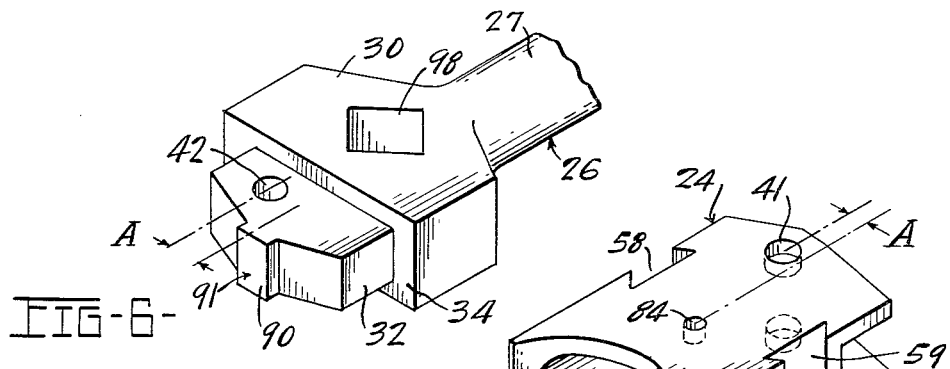
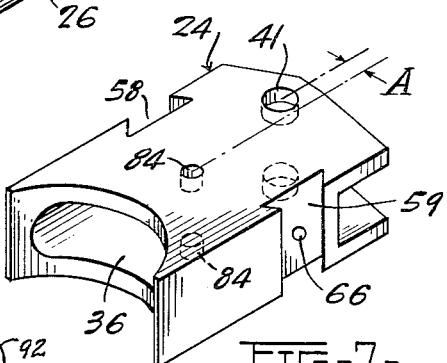
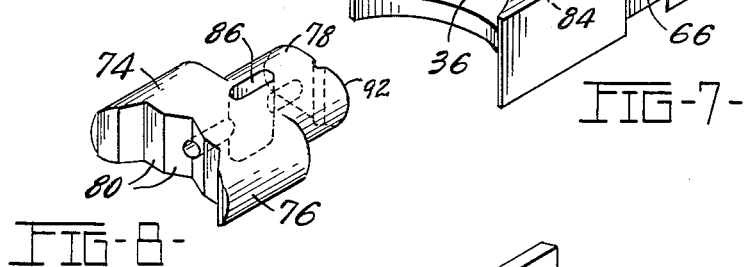
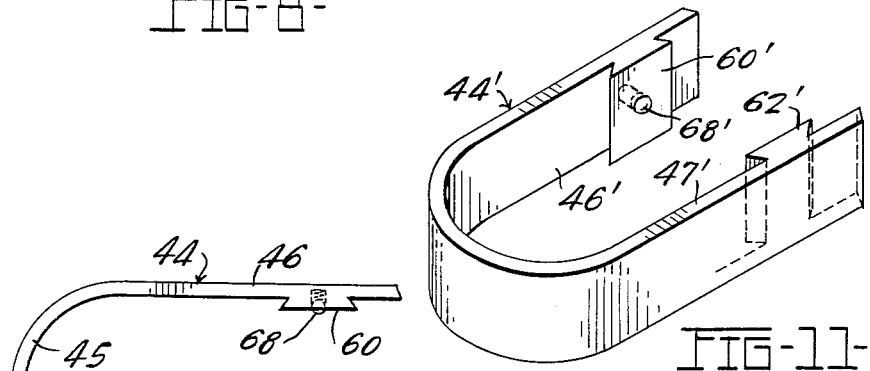
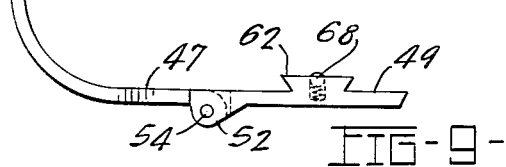
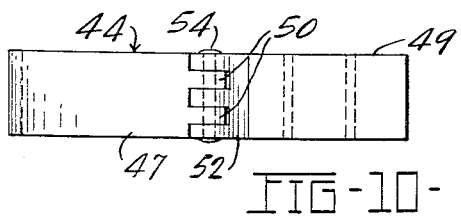
INVENTOR:
CLARENCE L. DRACKA.
BY
Harry O. Ernsberger
ATTY.

United States Patent Office 3,015,245
Patented Jan. 2, 1962

3,015,245
HANDLE-LEVER GRIP, SLIDABLE JAW
WRENCH
Clarence L. Dracka, Port Clinton, Ohio, assignor to Port
Clinton Manufacturing Company, Port Clinton, Ohio,
a corporation of Ohio
Filed Jan. 27, 1960, Ser. No. 4,996
7 Claims. (Cl. 81—126)

This invention relates to wrench construction and more particularly to a ratchet action wrench which is adaptable for tightening or loosening threaded components, parts, couplings or other machine elements in installations where clearance or tolerance for application and operative movement of a wrench is restricted or limited.

In many installations of threaded fittings, tubes, couplings, hose connections, nuts, bolts and the like, structural design renders it imperative that such threaded components be placed or positioned close together. For example, in aircraft construction it is a usual practice to install hose connections with various operative mechanisms requiring fluid pressure operation and to provide a control or distribution panel upon which are mounted several couplings associated with the various hose components. Such assemblies, particularly in aircraft installations, are quite compact and the couplings or connections arranged so that conventional wrench means cannot be utilized for connecting or disconnecting a coupling or couplings disposed close to other couplings.

Heretofore, in installations of such character, it has been necessary, in connecting or disconnecting a particular coupling, to first disconnect a series of adjacent couplings in sequence in order to disconnect and reconnect a particular coupling. In hydraulic pressure actuated mechanisms associated with hose connections of this character, it is necessary to completely bleed all lines which are disconnected and subsequently reconnected to eradicate air therefrom, a necessarily costly and time consuming operation.

The present invention embraces a wrench construction having a readily removable component or element arranged to straddle a polygonally shaped machine element, coupling or fitting incorporating a ratchet-action means enabling the successful manipulation of the wrench construction for connecting and disconnecting machine elements, couplings or fittings in installations where tolerance or clearance is insufficient to accommodate conventional types of wrenches.

Another object of the invention is the provision of a wrench construction embodying a readily removable member adapted to embrace the machine part or component to be manipulated in combination with a handle controlled, relatively movable element selectively engageable with the machine part or component for obtaining a ratchet movement usable where space for manipulating the machine element is limited or restricted.

Another object of the invention resides in a wrench construction of a ratchet type having a readily removable U-shaped means adapted to engage a machine component in conjunction with a slidable element operated by cam means for imparting a ratchet action or movement to rotate a machine component in successive steps wherein the U-shaped means is readily removable in order to apply the wrench and to reverse the wrench construction for ratchet movement in the opposite direction.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is a plan view of a control or distribution panel equipped with a plurality of hose couplings illustrating the wrench of the invention engaged with an intermediate coupling;

FIGURE 2 is a side elevational view of the arrangement shown in FIGURE 1 with one of the connections broken away for purpose of illustration;

FIGURE 3 is an enlarged sectional view through the wrench construction of the invention, the view being taken substantially on the line 3—3 of FIGURE 2;

FIGURE 4 is a sectional view taken substantially on the line 4—4 of FIGURE 3;

FIGURE 5 is a sectional view taken substantially on the line 5—5 of FIGURE 4;

FIGURE 6 is an isometric view of a portion of the handle construction of the wrench;

FIGURE 7 is an isometric view of a body member of the wrench construction;

FIGURE 8 is an isometric view of a component engaging element of the wrench construction;

FIGURE 9 is a plan view of a U-shaped element adapted to embrace a machine component to be manipulated;

FIGURE 10 is a side elevational view of the U-shaped element shown in FIGURE 9, and FIGURE 11 is an isometric view of a modified form of the U-shaped element.

While the wrench construction of the invention has particular utility in connecting or disconnecting hose couplings in installations where a plurality of couplings or fittings are in closely disposed relation, it is to be understood that the invention may be utilized for manipulating various machine elements or components wherever it may be found to have utility.

Referring initially to FIGURE 1, a form of wrench construction of the invention is illustrated as utilized for effecting connection or disconnection of a hose coupling or fitting of a control or distribution panel for pressure fluid actuated mechanisms. The control or distribution panel 10 is equipped with a plurality of connectors 12 to which are secured couplings or fittings 14, 15 and 16 associated respectively with flexible hose lines or tubes 18, 19 and 20.

Where the panel 10 and component parts are installed in aircraft, the hose lines 18, 19 and 20 conduct liquid under pressure for hydraulic operation of various mechanisms. The elements or parts 14, 15 and 16 may be in the form of hexagonally-shaped threaded collars or coupling unions for securing the hose lines to the fittings 12 carried by the panel 10. Especially in aircraft installations, the coupling constructions of the hose lines are necessarily arranged in close or compact relation as illustrated in FIGURE 1.

The wrench construction of the invention is especially usable for connecting or disconnecting an intermediate coupling or union such as that illustrated at 15 without affecting or disrupting any of the other couplings. The form of wrench construction of the invention illustrated in FIGURES 1 through 10 comprises a handle portion and a gripping portion and more specifically is inclusive of a hollow body member or housing 24 illustrated per se, in FIGURE 7, and a handle member 26. The handle member includes a shank portion 27 provided with a knurled hand grip 28 at its distal end and an enlarged portion or head 30 formed at the other end of the shank portion 27.

Projecting longitudinally from the enlarged portion 30 is an extension or projection 32 of generally rectangular shape in cross-section as shown in FIGURE 6 of lesser thickness and width than the portion 30 providing a ledge surface 34. The body or housing 24 has a hollow interior providing a chamber 36. The upper wall portion 38 and the lower wall portion 40 of the housing straddle the projection or extension 32 in the manner illustrated in FIGURE 4.

The walls 38 and 40 are provided with openings 41 and the projection 32 is provided with an opening 42, the openings being in registration to receive a pin or pivot member 43 for pivotally connecting the body 24 to the projection 32. As particularly shown in FIGURE 3, the axis of the pivot pin 43 is offset from the longitudinal axis of the projection 32 and the body member 24, the amount of offset being indicated at A in FIGURES 3, 6 and 7. The purpose of the offset position of the pin 43 is to effect a ratchet action in a manner hereinafter explained.

The wrench construction of the invention includes relatively movable elements associated with the body or housing 24 to engage a polygonally shaped component, coupling or machine part to be manipulated. One of the elements 44, in the embodiment illustrated, is of U-shaped configuration, particularly shown in FIGURES 1, 3, 9 and 10, the bight portion 45 of element 44 being adapted to embrace a peripheral region of a component to be manipulated, the leg portions 46 and 47 extending in parallelism and in contiguous relation with the side walls of the body 24.

In the embodiment illustrated in FIGURES 1 through 10, the leg portion 47 of the U-shaped member 44 is provided with a pivotally mounted or articulated portion 49. The portion 47 is fashioned with lugs 50 which extend into recesses formed in a boss portion 52 on the portion 49, the lugs 50 and overlapping adjacent portions of the boss 52 being provided with registering openings to accommodate a pivot pin 54. Through this arrangement, the element or portion 49 is pivotally joined to the leg portion 47 of the U-shaped member 44.

The U-shaped construction 44 including the element or portion 49 and the body 24 are formed with interengaging means facilitating ready removal and reconnection of the U-shaped element 44 with the body member 24 to enable the U-shaped element to be placed around or astraddle a coupling or machine part to be manipulated. As particularly shown in FIGURE 7, the side walls of the body member 24 are respectively provided with slots 58 and 59 preferably of dovetail cross-section.

The leg portion 46 of the element 44 is formed with a projection or tang 60 of a shape reciprocal to that of the slot 58. The portion 49, pivotally connected to the leg portion 47 of element 44, is formed with a similarly shaped tang or projection 62 for cooperation with the dovetail shaped slot 59 in the body 24. It will be apparent that the U-shaped element 44 including its portion 49 are thus readily interconnected with the body 24 by sliding the projections 60 and 62 into the slots 58 and 59 and thereby establish an operative connection between the body 24 and the U-shaped element 44.

It will be apparent that the U-shaped element 44 may be readily removed from connection with the body 24 by relative slidable movement between the body and the element in opposite directions. Detent means are provided for resiliently retaining the tangs 60 and 62 in the recesses 58 and 59. The lengthwise walls of the slots 58 and 59 are provided with partial spherically-shaped recesses 66 and each of the projections 60 and 62 provided with bores accommodating ball detents 68 which are biased outwardly under the influence of expansive coil springs 70.

The metal adjacent the entrances of the bores containing the ball detents 68 is swaged inwardly to limit the extent of outward movement of the ball detents 68. When the U-shaped element construction 44 is assembled with the body 24 as shown in FIGURES 1 and 3, the ball detents 68 engage in the recesses 66 to resiliently maintain the body and element against relative slidable movement. Slight manual pressure only is required to overcome the pressure of the biasing springs 70 to facilitate disengagement of element 44 from the body 24.

The chamber 36 in the body 24 accommodates a second element or plunger 74 for slidable movement relative to thte body 24 and the element 44. The element 74, illustrated in FIGURE 8, is formed with a component-engaging portion 76 of a contour to slidably fit within the chamber 36 in the body. Extending from portion 76 is a portion 78 of reduced cross-section which is slidably fitted within a portion of the chamber 36 of reduced size, the assembly of the elements 44, 74 and the body 24 being illustrated in FIGURE 3.

The surface region of the portion 76 opposite the bight portion 45 of the U-shaped element 44 is fashioned with a series of angularly arranged facets 80, arranged in pairs, the alternate apices of the pairs of facets being adapted to fit apices of a hexagonal or polygonally shaped coupling, machine part or component to be manipulated.

It should be noted that where the wrench is to be used for manipulating hexagonally shaped couplings, machine parts or components, the surface of the element 76 engageable therewith is fashioned with double the number of apices so as to facilitate rotative movement of the machine part or component through at least one twelfth of a revolution for each ratchet movement of the wrench construction as hereinafter explained.

The element 74 is normally resiliently biased toward a position out of engagement with a component to be manipulated. The upper and lower walls of the body 24 are provided with openings 84 in which is press fitted a pin 85. The element 74 is provided with a slot 86 elongated in the direction of slidable movement of the element 74 which accommodates the pin 85, as shown in FIGURES 3 and 4.

The element 74 is provided with an axial or longitudinally extending bore accommodating an expansive coil spring 88 which normally biases the element 74 away from engagement with a component. The projection 32 of the handle member 26 and the element 74 are provided with cooperating surfaces adapted for engagement and disengagement upon relative angular movement of the handle member 26 about the axis of the pivot pin 43 in order to effect lengthwise movement of element 74 for engagement and disengagement with a machine part or component to be manipulated.

The projection 32 is formed with a forwardly extending portion or land 90 of generally rectangular shape, the forward face 91 of which is adapted for engagement with an end surface or face 92 of portion 78 of element 74.

It should be noted from FIGURE 3 that the center of the projection or land 90 is offset from the longitudinal axis of the handle member so that upon relative angular movement of the handle member about the pivot 43 to the broken line position indicated in FIGURE 3, the land or cam means 90 is moved out of engagement with the surface 92 of the element 74, permitting retractive movement of the element 74 in a right-hand direction as viewed in FIGURE 3 under the influence of the expansive spring 88.

The face or surface 92 of the element 74 is formed with a recess or clearance space 94 to accommodate the corner region of the projection, cam or land 90 when the latter is moved to the broken line position indicated in FIGURE 3.

The operation of the wrench hereinbefore described is as follows: Assuming that it is desired to effect a connection or manipulation of the intermediate coupling 15 illustrated in FIGURE 1 with the fitting 12 on the panel 10 without disturbing or interfering with the adjacent couplings, the tangs 60 and 62 of the U-shaped element 44 may be slidably removed from engagement with the dovetail-shaped recesses 58 and 59 of the body 24 if necessary to embrace or straddle the coupling.

The position of the wrench construction shown in FIG-

URE 1 is adapted to connect the coupling 15, assuming that the coupling is provided with right-hand threads, the ratcheting action in the position shown being effective to move the coupling 15 in a clockwise direction to effect a drawing up of the coupling. The U-shaped element 44 is positioned to straddle or embrace the polygonally shaped fitting 15 as shown in FIGURE 1.

The body 24 of the wrench is then reengaged with the U-shaped element 44 by slidable movement of the tangs 60 and 62 in the recesses 58 and 59. This action is accomplished while the handle member 26 is in an angular position as indicated in broken lines in FIGURE 1. With the handle member in the broken line position shown in FIGURE 3, the spring 88 moves or biases the element 74 to its extreme position with the recess 94 accommodating the corner region of the land or cam 90 on the handle member. In this position, the facets 80 of the plunger element 74 are free of clamping engagement with the coupling or fitting 15.

The handle member 26 is then swung about the pivot 43 in a clockwise direction, which movement engages the cam or land 90 with the surface 92 of the plunger element 74, thus effecting slidable movement of the element 74 in a left-hand direction as viewed in FIGURES 1 and 3, and engaging alternate facets 80 with surfaces of the hexagonally shaped coupling 15 so as to securely clamp the plunger element 74 and the U-shaped element 44 to the coupling or nut 15, the clamping action being maximum when the handle portion 26 is aligned with the longitudinal axis of the body 24 as shown in full lines in FIGURES 1 and 3.

To effect a tightening movement of the coupling 15, the handle is further rotated in a clockwise direction rotating the coupling 15 through an angle equal to the angle of movement of the handle 26 and the body 24 permitted by an adjacent coupling or threaded union 14 of the hose assembly.

Upon angular movement of the handle 26 in a counterclockwise direction about the pin 43, the cam 90 is again moved to the broken line position shown in FIGURE 3, permitting the plunger element 74 to move in a right-hand direction under the influence of the spring 88 withdrawing the plunger from clamping engagement with the nut or coupling 15.

Further counterclockwise movement of the handle 26 engages the ledge 34 of the enlarged portion 30 with an end of the leg 46 of the U-shaped element 44 to rotate the body 24 and elements carried thereby generally about the axis of the nut or coupling 15. As the U-shaped element and plunger element 74 are out of clamping engagement with the nut or coupling 15, the latter will not be rotated during counterclockwise movement of the handle 26 and the body 24.

On the next succeeding angular movement of the handle member 26 about the pin 43 in a clockwise direction, the plunger element 74 is again forced into engagement with the nut or coupling 15 by the cam 90 and another operative stroke of the wrench construction completed to attain further rotation of the coupling or nut 15. When the nut or coupling 15 has been drawn up or tightened, the U-shaped element 44 is slidably moved from engagement with the body 24 and disengaged from the nut or coupling 15.

When it is desired to disconnect a coupling such as coupling 15, or other coupling the wrench construction is utilized in an inverted position from that shown in FIGURE 1. In initially affixing the wrench to a tightened coupling 15, the U-shaped element 44 by itself is disposed to embrace or straddle the nut or coupling 15, and the body 24 is slidably assembled to the element 44 through the interengagement of the tangs 60 and 62 with the recesses 58 and 59, the assembly being in a reverse or inverted position from that shown in FIGURE 1, the pin 43 being then on the opposite side of the longitudinal axis through the body and handle as viewed in FIGURE 1.

To accomplish a disconnection of the nut or coupling 15, a reverse cycle of ratcheting actions takes place involving the same movements of the components and elements of the wrench as described in reference to the ratcheting action in tightening the coupling. The detents 68 cooperate with the recesses 66 to resiliently retain the U-shaped element 44 in its assembled position with the body 24. The spring pressure on the ball detents 68 is readily overcome by slight manual pressure in a direction to slidably disconnect the U-shaped element from the body.

The portion 49, pivotally secured to the leg 47 of the U-shaped element 44, is adapted for relative articulate movement as may be expedient or desirable in affixing or removing the U-shaped element from a nut, coupling or machine part, in order to avoid interference with adjacent components.

FIGURE 11 illustrates a modified form of U-shaped element 44' provided with leg portions 46' and 47'. In this form, the U-shaped element is fashioned as one piece, the legs being formed with dovetail-shaped tangs 60' and 62' for coupling with the dovetail-shaped recesses 58 and 59 formed in the body 24. The functioning of U-shaped element 44' is substantially the same as the functioning of the element 44.

The portion 30 of the handle member 26 is provided with a square or polygonally shaped opening 98.

It will be apparent that the wrench construction of the invention provides a removable connection which may be employed where the clearance or tolerance adjacent a component to be manipulated is restricted, and enables the manipulation of any of a series of machine elements, couplings or nuts disposed in close relationship whereby a particular nut or coupling may be connected or disconnected without affecting or disturbing adjacent couplings or other machine elements.

It is apparent that, within the scope of the invention, modifications and different arrangements may be made other than as herein disclosed, and the present disclosure is illustrative merely, the invention comprehending all variations thereof within the purview of the appended claims.

I claim:

1. A ratchet wrench including, in combination, a body member, a handle member pivotally joined with the body member, an element slidably mounted within an opening in the body member and formed with a plurality of angularly arranged facets adapted for engagement with a polygonally shaped fitting, a U-shaped element, means providing slidable interconnection between said body member and U-shaped element whereby said member and element may be readily engaged and disengaged, abutment surfaces formed on said handle member and said slidable element arranged to impart movement to said slidable element relative to the body member upon relative pivotal movement between said handle and body members to provide a ratcheting action between the elements and the polygonally shaped fitting.

2. A ratchet wrench including, in combination, a body member, a handle member pivotally joined with the body member, a plunger element slidably mounted within an opening in the body member and formed with a plurality of angularly arranged facets adapted for engagement with a polygonally shaped fitting, a U-shaped element, means providing a laterally slidable interconnection between said body and U-shaped element whereby said body member and U-shaped element may be readily engaged and disengaged, abutment surfaces associated with said handle member and said plunger element arranged to impart movement to said plunger element relative to the body member upon relative pivotal movement between said handle and body members to provide a ratcheting action between the elements and the fitting.

3. A ratchet wrench for manipulating polygonally shaped fittings including, in combination, a housing formed with a chamber, a plunger element slidably disposed in said chamber, a wall of the housing being formed with a recess, a U-shaped element having a projection arranged to be slidably received in the recess in said housing, said U-shaped element and said plunger element having surfaces adapted to engage a fitting to be manipulated, a handle member, means pivotally joining the handle member to the housing on an axis offset from the central axis of the plunger element, and cooperating surfaces on the plunger element and said handle member whereby movement of said handle member relative to said housing effects relative movement between said elements.

4. A ratchet wrench for manipulating polygonally shaped fittings including, in combination, an elongated body member formed with a chamber, a handle member, said body member being pivotally connected with the handle member for relative angular movement about an axis offset from the longitudinal central axis of said body, a first element adapted to embrace a peripheral region of a fitting to be manipulated and having removable connection with said body, a second element movably mounted in said chamber and adapted for engagement with a peripheral region of the fitting to be manipulated, cam means provided on said handle member adapted upon movement of said handle member in one direction relative to said body to effect relative movement of the elements into clamping engagement with the fitting and to release the elements from the fitting upon movement in the opposite direction to establish a ratcheting action for manipulating the fitting.

5. A ratchet wrench for manipulating polygonally shaped fittings including, in combination, an elongated body formed with a chamber, a handle member, said body being pivotally connected with the handle member for relative angular movement, a first element adapted to embrace a peripheral region of a fitting to be manipulated and having a slidable connection with said body, a second element movably mounted in said chamber and adapted for engagement with a peripheral region of the fitting to be manipulated, resilient means associated with the second element normally biasing the same to a position out of engagement with the fitting, means provided on said handle member engageable with the second element upon angular movement of the handle member relative to said body in one direction to effect relative movement of the elements into clamping engagement with the fitting and to release the fitting upon relative movement of the handle member in another direction to establish a ratcheting action for manipulating the fitting.

6. A ratchet wrench for manipulating polygonally shaped fittings including, in combination, an elongated body formed with a chamber, a handle member, said body being pivotally connected with the handle member for relative angular movement about an axis offset from the longitudinal axis of said body, a first element adapted to embrace a peripheral region of a fitting to be manipulated and having a slidable interlocking connection with said body, a second element movably mounted in said chamber and adapted for engagement with a peripheral region of the fitting to be manipulated, resilient means associated with said second element normally biasing the same to a position out of engagement with the fitting, cam means provided on said handle member adapted upon angular movement of said handle member in one direction relative to said body to effect movement of the second element into clamping engagement with the fitting and to release the fitting upon angular movement of the handle member in another direction to establish a ratcheting action for manipulating the fitting.

7. A ratchet wrench for manipulating polygonally shaped fittings including in combination a handle portion and a gripping portion; said gripping portion including a body member, a slidable element, and a U-shaped element; said slidable element mounted within an opening in said body member, one of said elements being formed with a plurality of angularly arranged facets adapted for engagement with one of said polygonally shaped fittings, means providing slidable interconnection between said body member and said U-shaped element whereby said body member and said U-shaped element may be readily engaged and disengaged, said handle portion including a handle pivotally connected to said gripping portion, and abutment surfaces formed in said handle portion and said gripping portion to provide a ratcheting action between said elements and said fitting.

References Cited in the file of this patent

UNITED STATES PATENTS

| | | |
|---|---|---|
| 443,312 | Bode | Dec. 23, 1890 |
| 946,506 | Gillespie et al. | Jan. 11, 1910 |
| 988,691 | Brodhagen | Apr. 4, 1911 |
| 999,361 | Burger | Aug. 1, 1911 |
| 1,326,172 | Boehm | Dec. 30, 1919 |
| 1,415,867 | Coleman | May 16, 1922 |
| 1,657,902 | Ross | Jan. 31, 1928 |
| 1,924,389 | Baash et al. | Aug. 29, 1933 |
| 2,483,713 | Seaver | Oct. 4, 1949 |
| 2,498,582 | Schoenberger | Feb. 21, 1950 |

FOREIGN PATENTS

| | | |
|---|---|---|
| 69,620 | Denmark | July 18, 1949 |